Patented Feb. 27, 1945

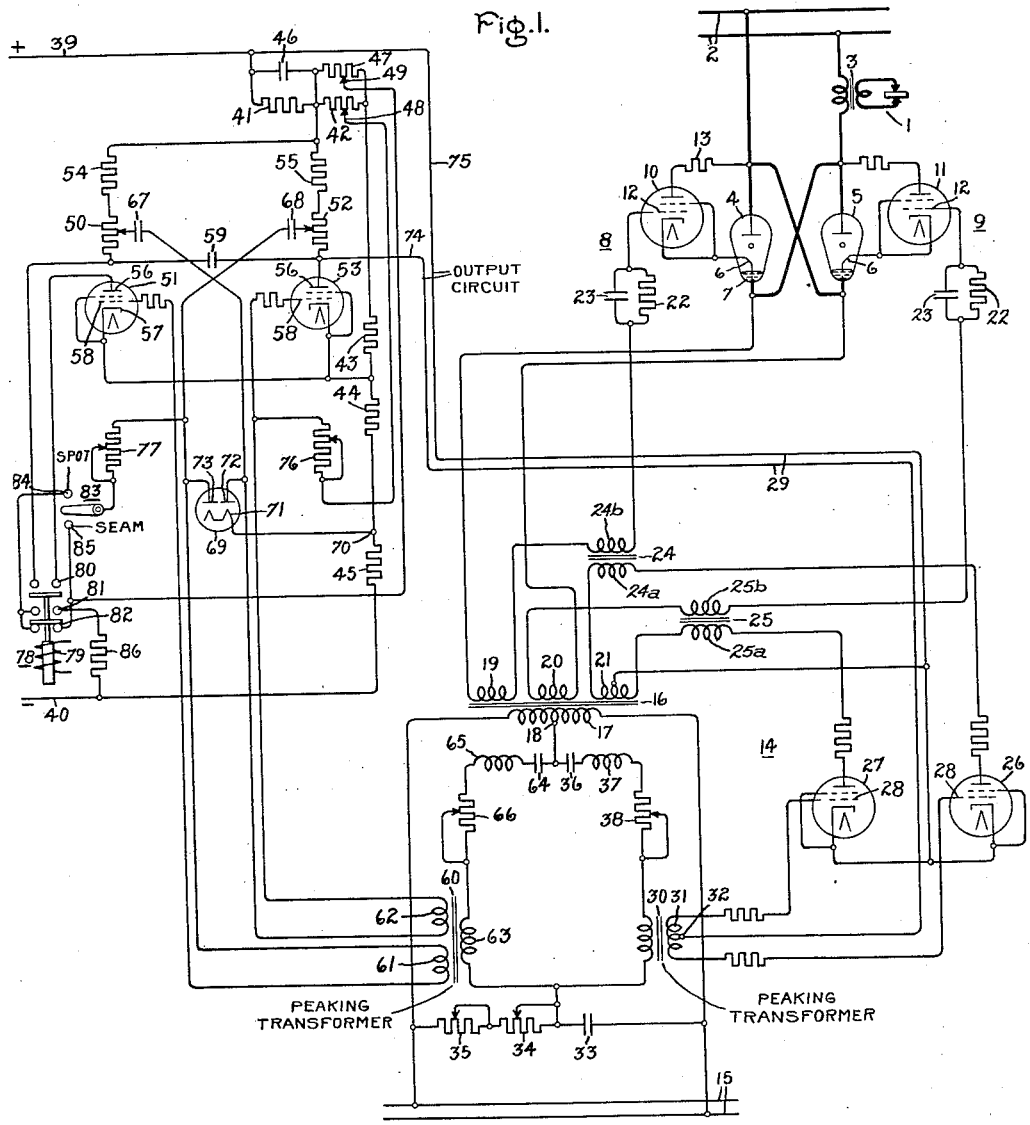

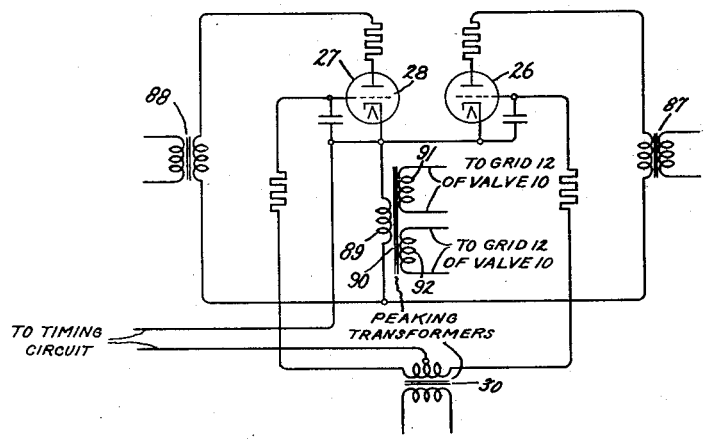
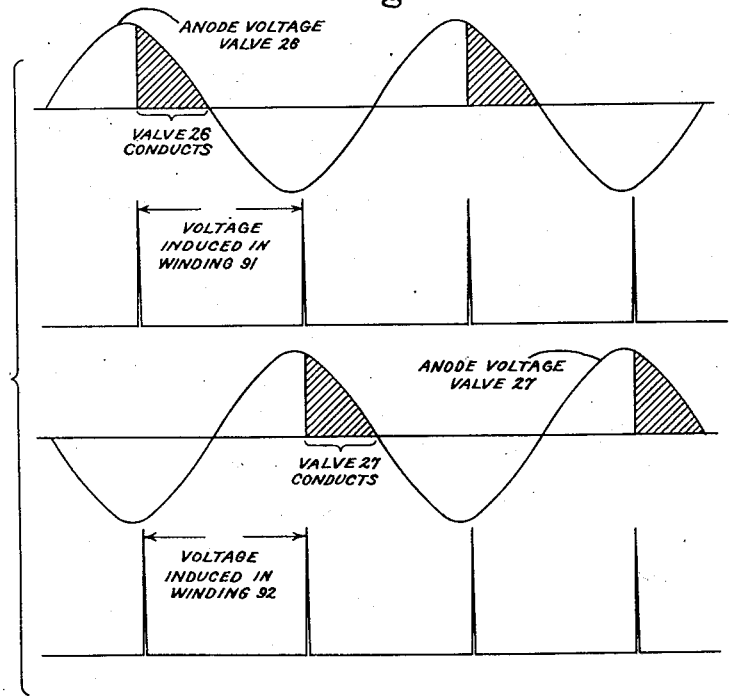

2,370,287

UNITED STATES PATENT OFFICE 2,370,287

ELECTRIC VALVE CIRCUIT

Maurice E. Bivens, Schenectady, N. Y., assignor to General Electric Company, a corporation of New York Application June 29, 1942, Serial No. 449,021

8 Claims. (Cl. 250—27)

My invention relates to electric valve translating circuits and more particularly to control or excitation circuits for electric valve means.

In some industrial applications, as for example in electric resistance welding systems, it is desirable to employ control circuits which not only accurately determine the amount of current transmitted to the welding circuit during definite intervals of time, but it is also of importance, in order to utilize to the best advantage the desirable features of electric valve apparatus, to provide means to effect the initiation of current flow to the welding circuit at precise instants and to maintain the current flow for an accurately determinable number of half cycles of voltage of an alternating current supply circuit.

In accordance with the teachings of my invention described hereinafter, I provide a new and improved electric valve control circuit wherein greater precision and reliability of operation are obtained than that afforded by the prior art arrangements.

It is an object of my invention to provide a new and improved electric translating system.

It is another object of my invention to provide a new and improved electric valve translating system.

It is a further object of my invention to provide a new and improved electric valve control circuit which transmits impulses of current to a control member of an electric valve means, and wherein the time of occurrence of the impulses is accurately determinable and controllable.

It is a still further object of my invention to provide a new and improved electric valve control circuit for electric valve translating apparatus wherein a load circuit, such as a welding circuit, is energized for a predetermined interval of time or energized intermittently or periodically and wherein the amount of current transmitted to the welding circuit during each interval of energization is precisely controllable.

Briefly stated, in the illustrated embodiment of my invention I provide an electric valve control circuit for controlling the operation of electric valve means which, in turn, determine or control the energization of a load circuit such as a welding circuit. The translating system includes electric valve means which controls the energization of the load circuit. The electric valve means are normally maintained nonconducting by bias means, and the electric valve means are rendered conducting at the desired times by an improved control circuit which produces impulses of voltage sufficient to overcome the effect of the bias means.

Figure 4:
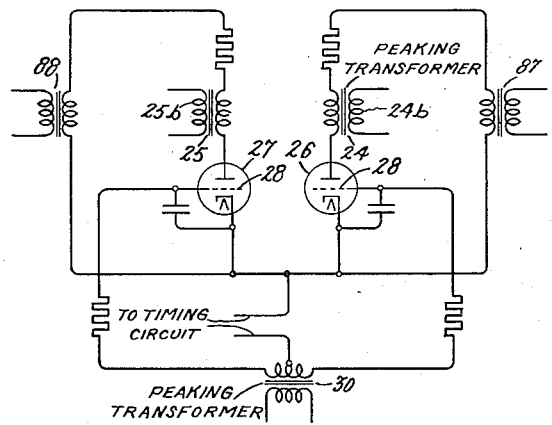
Figure 5:
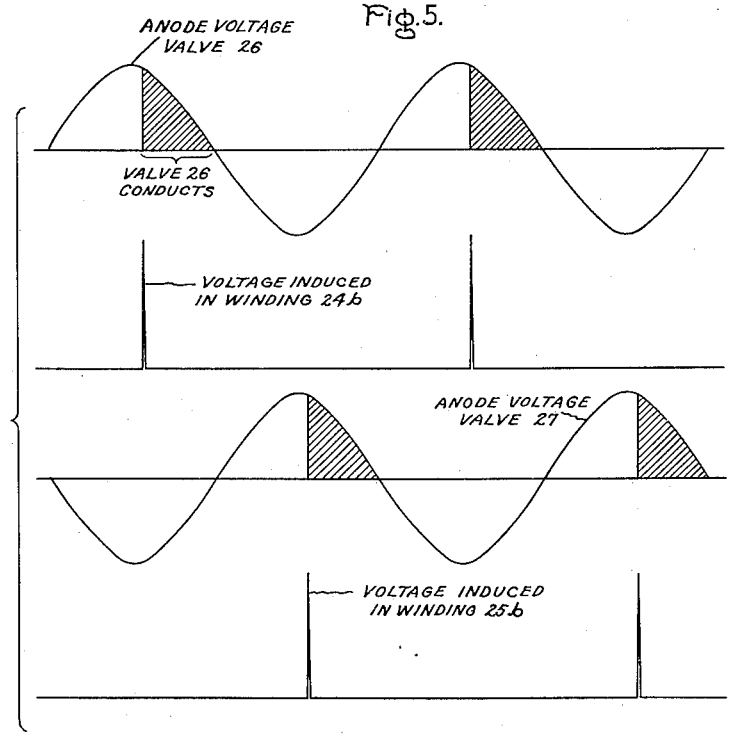

For a better understanding of my invention, reference may be had to the following description taken in connection with the accompanying drawings, and its scope will be pointed out in the appended claims. In the drawings, Fig. 1 is a schematic representation of one embodiment of my invention; Fig. 2 is a schematic representation of a modification; Fig. 3 represents certain operating characteristics of the embodiment illustrated in Fig. 2; Fig. 4 is a schematic representation of still another modification of my invention, and Fig. 5 represents certain operating characteristics of the arrangement illustrated in Fig. 4.

Referring now to Fig. 1 of the drawings, I have there illustrated my invention as applied to an electric valve translating system for energizing a load circuit, such as a welding circuit 1, from an alternating current supply circuit 2 through electric translating apparatus comprising a transformer 3 and electric valve means 4 and 5. The electric valve means 4 and 5 may be connected inversely or reversely in parallel in order that alternating current may be transmitted to the transformer 3 and the welding circuit 1. Figs. 2 and 4 represent certain modifications of my invention wherein shock excitation of transformers in excitation circuits is provided; and Figs. 3 and 5 represent certain operating characteristics thereof.

The electric valve means 4 and 5 may be of the type comprising an ionizable medium, such as a gas or a vapor, and may include a control member such as an immersion-igniter type control member 6 associated with a mercury pool cathode 7. Arc discharges are initiated between the anodes and the cathodes of the respective electric valves 4 and 5 by transmitting to each of the control members a current of sufficient magnitude to initiate a cathode spot.

I provide excitation circuits 8 and 9 for controlling the energization of the immersion-igniter control members 6 of electric valve means 4 and 5. These excitation circuits comprise control electric valve means 10 and 11 which are also preferably of the type employing an ionizable medium, such as a gas or a vapor, and each includes a control member or grid 12, the potential of which with respect to the associated cathode determines the conductivity of the electric valve means. If desired, the excitation circuits 8 and 9 may be of the type wherein the energization is derived directly from the anode of the associated main electric valve and in which the excitation circuits are responsive to the magnitude and polarity of the voltage applied between the anode and the cathode of the associated main electric valve. It will be appreciated that other types of excitation circuits for the electric valve means 4 and 5 may be employed, if desired. For example, the excitation circuits 8 and 9 may be energized from separate sources of current. Current limiting resistances 13 are connected in series relation with the anode-cathode circuits of control electric valve means 10 and 11.

I provide a control circuit 14 which controls the potential of the grids 12 of electric valve means 10 and 11 and which thereby controls the energization of the immersion-igniter control members 6 and consequently controls the energization of the welding circuit 1. The control circuit 14 during those intervals of time within which it is desired to energize the welding circuit renders either of the electric valve means 10 and 11 conductive if it is desired to effect the transmission of current to the welding circuit 1 during only one-half cycle. If it is desired to energize the welding circuit 1 for more than one-half cycle, the control circuit 14 renders the electric valve means 10 and 11 conducting alternately during the desired interval of time. The control circuit 14 in conjunction with the timing means described hereinafter may also effect periodic or intermittent energization of the welding circuit 1.

Referring now more particularly to the control circuit 14, I provide means which are energized from a suitable source of current, such as an alternating current circuit 15, preferably of the same frequency as circuit 2. Of course, it is to be understood that the circuit 15 may be energized from the alternating current circuit 2. I provide a transformer 16 having a primary winding 17 connected to the alternating current circuit 15, and the primary winding 17 is provided with a neutral or intermediate connection 18. Transformer 16 also includes secondary windings 19, 20 and 21.

In order to maintain the electric valve means 10 and 11 normally nonconducting, I provide bias means, such as a pair of parallel connected resistances 22 and 23, which serve to impress on the grids 12 negative unidirectional biasing voltages by virtue of the grid rectification characteristics of the electric valve means. These biasing means are connected in circuit with secondary windings 19 and 20, respectively.

Secondary windings 19 and 20, which are also bias means, are poled to impress on the grids 12 of electric valve means 10 and 11 alternating hold-off voltages which are displaced substantially 180 electrical degrees with respect to the anode-cathode voltages of electric valve means 10 and 11.

In order to supply to the grid circuits for the electric valve means 10 and 11 impulses of voltage sufficient to overcome the effect of the biasing means, I provide transformers 24 and 25 having primary winding means 24a and 25a and secondary winding means 24b and 25b respectively. Transformers 24 and 25 may be of the saturable inductive type to produce in the secondary winding means voltages of sharp or peaked wave form.

The source of alternating current furnished by secondary winding 21 of transformer 6 is connected to the primary winding means 24a and 25a through electric valves 26 and 27. The electric valves 26 and 27 may also be of the type employing an ionizable medium such as a gas or a vapor, and each comprises a control grid 28 the potential of which determines the current flow therethrough or the conductivity thereof.

I provide means for controlling the conductivities of the electric valve means 26 and 27 to impulse excite the transformers 24 and 25. This impulse excitation is obtained by controlling the conductivities of the electric valves 26 and 27 so that steep wave front voltages are applied to the primary winding means 24a and 25a.

The time of initiation of conduction of current by electric valve means 26 and 27 is determined by the voltage of circuit 29. This circuit is energized by timing means described hereinafter and may be a control voltage of substantially rectangular or square wave form, the relatively positive impulses of which determine the times at which the electric valves 26 and 27 are rendered conducting and also determine the period of conduction.

As a means for rendering the electric valves 26 and 27 conducting alternately at times or during intervals established by the voltage of circuit 29, I provide a transformer 30 which may be a peaking transformer for impressing on the grids 28 alternating voltages of peaked wave form displaced substantially 180 electrical degrees. Secondary winding 31 of transformer 30 is provided with an electrical neutral or intermediate connection 32 and which is connected to one terminal of circuit 29.

The primary winding of transformer 30 may be energized through a suitable phase shifting arrangement from the alternating current circuit 15. This phase shifting arrangement may comprise a capacitance 33 and adjustable impedance elements such as resistances 34 and 35 which control the phase of the voltage supplied to transformer 30 and, hence, control the phase of the peaked alternating output voltage of this transformer. Transformer 30 may also be connected in circuit with a suitable filtering means such as a capacitance 36 and an inductance 37 to the neutral connection 18 of transformer 17. A further phase shifting means, such as an adjustable resistance 38, may be connected in series relation with a capacitance 36, resistance 37, and the primary winding of transformer 30.

Circuit 29 may be energized from any suitable timing means which produces an impulse of voltage or a series of impulses to determine the time of conduction of current by electric valves 26 and 27. I have chosen to represent this timing means as being of the type disclosed and claimed in a copending patent application Serial No. 449,023 of Orrin W. Livingston, filed concurrently herewith and assigned to the assignee of the present application.

More particularly, I may employ a source of direct current including a positive conductor 39 and a negative conductor or terminal 40. I connect across the conductors 39 and 40 a voltage divider including resistances 41—45, inclusive. If desired, a filtering capacitance 46 may be connected across resistance 41, and a separate voltage divider comprising a resistance 47 may be connected across resistance 42. Resistances 42 and 47 are provided with adjustable contacts 48 and 49, respectively, the functions of which will be explained hereinafter.

I employ a pair of parallel connected electric circuits energized from points of the voltage divider including resistances 41—45 which are intermediate the terminal connections, and each of which comprises a serially connected impedance element and an electric discharge device. More particularly, one electric circuit includes a serially connected resistance 50 and an electric discharge device 51, and the other of which includes a serially connected resistance 52 and an electric discharge device 53. If desired, additional current limiting means, such as resistances 54 and 55, may be connected in series relation with electric discharge devices 51 and 53, respectively. The electric discharge devices 51 and 53 are preferably of the type employing an ionizable medium, such as a gas or a vapor, and each comprises an anode 56, a cathode 57 and a control grid 58. Commutating means, such as a capacitance 59, is connected across the parallel connected electric circuits and serves to effect transfer of the current from a conducting electric circuit to a nonconducting electric circuit when its electric discharge device is caused to conduct current. The grid circuits for electric discharge devices 51 and 53 include means which impress on the grids 58 positive impulses of voltage to render discharge devices 51 and 53 conducting at precisely determinable instants of time. This means may comprise a saturable peaking device, such as a peaking transformer 60 having secondary windings 61 and 62 which are connected in circuit with grids 58 of discharge devices 51 and 53, respectively. The peaking transformer 60 may be energized from the bridge circuit described above, and may have its primary winding 63 connected to be energized through filtering means such as a capacitance 64, an inductance 65 and a phase adjusting resistance 66. The phase of the output voltage of secondary windings 61 and 62 is also controllable by means of resistances 34 and 35.

As a means for impressing on the grids 58 of the electric discharge devices 51 and 53 negative unidirectional biasing potentials, I employ a pair of capacitances 67 and 68 which are crisscrossed from resistances 50 and 52 to grids 58 of discharge devices 53 and 51, respectively. Capacitances 67 and 68 are charged by means of a pair of unidirectional conducting paths which may be provided by an electric valve 69 connected between capacitances 67 and 68 and a relatively negative point 70 of the voltage divider including resistances 41—45. The electric valve 69 may be of the type having an electrically common cathode 71 and separate anodes 72 and 73 which are, respectively, connected to capacitances 67 and 68. As will be more fully explained in connection with the operation of the system, the electric valve 69 limits the minimum value of negative unidirectional biasing potential impressed on control grids 58 of discharge devices 51 and 53, thereby definitely establishing that value of negative biasing potential which affords the maximum precision in the time of initiation of current conduction by electric discharge devices 51 and 53.

It will be noted that circuit 29, which constitutes an output circuit for the timing circuit, comprises a conductor 74 which is connected to one of the parallel connected electric circuits such as that including the discharge device 53. More particularly, conductor 74 may be connected directly to anode 56 of discharge device 53. Conductor 75 of the output circuit 29 may be connected to a point of relatively fixed potential, such as conductor 39 of the direct current source. When the electric discharge device 53 conducts current, the potential of conductor 74 is lowered and when the electric discharge device 53 is nonconducting its potential is raised. Due to the operation of the peaking transformer 60 and the poling of its secondary windings 61 and 62, the electric discharge devices 51 and 53 are rendered conducting alternately. I employ means for controlling the relative duration of the periods of conduction of electric discharge devices 51 and 53. This means comprises circuits connected between the grid circuits for the electric discharge devices 51 and 53 to control the rate at which the capacitances 68 and 67 discharge, thereby controlling the rate at which the potentials impressed on grids 58 rise. For example, I connect between capacitance 67 and a relatively positive point of the voltage divider including resistances 41—45, such as the adjustable contact 48 of resistance 42, means for controlling the time constant of the discharge circuit for this capacitance. A variable impedance element, such as a variable resistance 76, is connected in the discharge circuit for the capacitance 67. This discharge circuit includes the anode-cathode circuit of discharge device 51. In like manner, a variable impedance element, such as a variable resistance 77, may be connected in circuit with the capacitance 68 and grid 58 of electric discharge device 51 to control the time constant of the discharge circuit for this capacitance. Of course, as will be explained hereinafter, the discharge circuit for capacitance 68 includes the anode-cathode circuit of the electric discharge device 53.

As a means for initiating operation of the timing circuit, I employ circuit controlling means such as a relay 78 which may include an actuating coil 79 and may include contacts 80, 81 and 82. Contacts 81 are normally open and are connected in the anode-cathode circuit of electric discharge device 51. Contacts 82 are employed when the system is set for a spot welding operation, that is when the control circuit is preset or established to produce a single impulse of control voltage. Normally closed contacts 82 are employed to close a discharge path for capacitance 68 when the system is set for spot welding operation.

Means are provided for presetting the timing means for producing either a single impulse of control voltage or for producing a series of impulses of control voltage. This means may comprise a switch 83 having contacts 84 and 85, the former of which connect the grid 58 of discharge device 51 to the negative terminal 40 of the direct current source through a resistance 86, thereby permitting only a single interval of conduction by the electric discharge device 51 upon a single circuit controlling operation of relay 78. The resistance 86 serves to impress on grid 58 of discharge device 51 a negative unidirectional biasing potential through contacts 81 of sufficient magnitude to overcome the effect of the voltage of peaked wave form produced by secondary winding 61 of transformer 60. When contact 85 of switch 83 is closed, the timing means produces a series of impulses of control voltage to render the electric discharge devices 51 and 53 conducting alternately, the period of conduction by the devices being determined by the adjustment of the circuits including resistances 76 and 77, contacts 48 and 49, and resistances 50 and 52.

The operation of the embodiment of my invention shown in Fig. 1 of the drawings will be explained by considering the system when it is set to operate as a seam electric resistance welding system, that is when the welding circuit 1 is energized periodically during predetermined recurring intervals of time. This type of operation is effected by operating switch 83 to close its contact 85. The welding operation is performed so long as actuating coil 79 of relay 78 is energized.

The control circuit 14 controls the conductivities of electric valve means 10 and 11 and more particularly renders the electric valve means 10 and 11 conducting alternately during recurring intervals of time established by the impulses of the timing voltage supplied by circuit 29. For example, the system may be operated by adjusting the timing circuit so that the electric valve means 10 and 11, and electric valve means 4 and 5, conduct current alternately for six cycles of voltage of the alternating current supply circuit 2 and are maintained nonconducting for a predetermined number of half cycles thereafter whereupon the welding operation is then automatically reinitiated to effect energization of the welding circuit 1 for six cycles. This operation continues until the relay 78 is deenergized.

The voltage of the timing circuit 29 varies from one predetermined negative value, which is sufficient to maintain the electric valves 26 and 27 nonconducting, to a second negative value which permits the alternating voltages of peaked wave form furnished by transformer 30 to render the electric valves 26 and 27 conducting alternately. The time of initiation of the impulses of the control voltage are accurately established by the timing means, and therefore the time of initiation of current flow to the welding circuit 1 is also accurately controllable.

The electric valves 26 and 27 impulse excite the transformers 24 and 25, thereby alternately inducing in the secondary winding means 24b and 25b voltages of peaked wave form of sufficient magnitude to overcome the hold-off or biasing voltages provided by secondary windings 19 and 20 and the associated parallel connected resistances 22 and capacitances 23. This impulse excitation is obtained to a great extent by causing the electric valves 26 and 27 to be rendered conducting during the respective positive half cycles of applied anode-cathode voltage at times when the instantaneous value of the anode-cathode voltage is relatively large. For example, the maximum impulse excitation is obtainable when the electric valves 26 and 27 are rendered conducting at substantially the 90 degree point of the respective positive half cycles of applied anode-cathode voltage. This anode-cathode voltage is, of course, obtained from secondary winding 21.

The amount of current transmitted to the welding circuit 1 is controllable by adjustment of resistances 34 and 35. In this manner the phase of the alternating voltages of peaked wave form impressed on grids 28 of electric valve means 26 and 27 is adjustable or controllable with respect to the voltage of supply circuit 2. As the phase of the peaked voltages is advanced toward the zero point of the positive half cycles, the amount of welding current is increased, and as the phase of these peaked voltages is retarded the amount of welding current is decreased.

The operation of the timing means will now be considered briefly. Upon energization of the direct current source including conductors 39 and 40, the electric discharge device 51 is maintained nonconducting since contacts 80 of relay 78 are open. The electric discharge device 53 however conducts current, the initiation of conduction of current being accomplished by the peaked voltage furnished by secondary winding 62. Electric discharge device 53 continues to conduct current until electric discharge device 51 is rendered conducting. So long as discharge device 53 conducts current the potential of conductor 74 and hence the potential of grids 28 of electric valves 26 and 27 are maintained at a value sufficiently negative to maintain the electric valves 26 and 27 nonconducting.

Upon closure of relay 78 by energization of coil 79, contacts 80 of this relay close the anode-cathode circuit of discharge device 51. When discharge device 51 is rendered conducting by its peaked grid voltage, current is commutated from discharge device 53 to discharge device 51, thereby initiating an impulse of control voltage. Although this impulse of voltage is a relatively positive voltage, its absolute magnitude is negative but is of a value which is sufficiently small to permit the voltages of peaked wave form produced by transformer 30 to render the electric valves 26 and 27 conducting. The period of time during which the relatively positive impulse is produced is determined by the period the electric discharge device 51 conducts current. By the adjustment of the timing means, the electric valve 53 subsequently is rendered conducting thereby rendering the electric discharge device 51 nonconducting and terminating the period of the relatively positive impulse. In this manner the electric discharge devices 51 and 53 conduct current alternately to produce the periodic timing voltage. The absolute values and the relative values of the time-on and time-off periods established by the timing voltage are controllable or adjustable by means of resistances 42, 47, 50, 52, 76 and 77.

If it is desired to effect only a single energization of the welding circuit 1 in response to a single circuit controlling operation of relay 78, switch 83 is moved to close contact 84. When the system is set for this type of operation, the discharge device 51 conducts current only once for a single closure of relay 78. Therefore, only one impulse of control voltage will be supplied to control circuit 29.

Fig. 2 diagrammatically illustrates a modification of my invention wherein peak or shock excitation is employed for controlling the conductivity of electric valve means. Certain features and elements of the arrangement of Fig. 1 correspond to elements of circuit 14 of Fig. 1 and corresponding elements have been assigned like reference numerals. In the arrangement of Fig. 2 the anode-cathode circuits of the electric valves 26 and 27 are energized from alternating current means such as transformers 87 and 88. The anode-cathode circuits of both electric valves 26 and 27 are connected in circuit with the primary winding 89 of transformer 90 and supply to the transformer 90 impulses of voltage having steep wave fronts. Transformer 90 may be a peaking transformer of the saturable inductive type and may include secondary windings 91 and 92 which are connected to the grids 12 of electric valve means 10 and 11 of Fig. 1.

The phase of the voltage impressed on the grids 28 of electric valves 26 and 27 is such that the electric valves are rendered conducting at or in the region of the 90 electrical degree points of the positive half cycles of applied anode-cathode voltage. The voltages supplied to transformers 87 and 88 are displaced 180 electrical degrees with respect to each other so that when electric valves 26 and 27 conduct current, an impulse of current is transmitted to winding 89 during each half cycle.

The manner in which the circuit shown in Fig. 2 operates may be more fully appreciated by referring to the characteristics shown in Fig. 3. The shaded portions of the sinusoidal curves represent the periods during which electric valves 26 and 27 conduct current. By virtue of the initiation of current conducted by these valves through primary winding 89, impulses of voltage are induced in windings 91 and 92. Inasmuch as winding 89 is energized by both valves 26 and 27 peaked voltages are induced in each of the windings 91 and 92 during each half cycle or twice during any one cycle.

A further modification is shown in Fig. 4 which is similar in many respects to the circuit arrangement of Fig. 2. In the arrangement of Fig. 4 separate peaking transformers 24 and 25 are employed similar in arrangement to that shown in Fig. 1.

The operating characteristics shown in Fig. 5 represent the nature of the voltages induced in the secondary windings of the peaking transformers 24 and 25. When the electric valves 26 and 27 are rendered conducting within the neighborhood of the 90 electrical degree point, impulses of voltage are induced alternately in the secondary windings of transformers 24 and 25. The shaded portions of the sinusoidal curve represent the periods of conduction of electric valves 26 and 27. Since the transformers 24 and 25 are associated, respectively, with electric valves 26 and 27 it will be noted that only one impulse of voltage is induced in each secondary winding during each cycle.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current circuit, a load circuit, electric translating apparatus connected between said circuits and comprising electric valve means for controlling the energization of said load circuit, said electric valve means comprising an anode, a cathode, and a control member, bias means for impressing on said control member an alternating hold-off voltage displaced 180 electrical degrees with respect to the anode-cathode voltage of said electric valve means, a source of alternating current, a transformer having primary winding means and secondary winding means connected in circuit with said bias means, means comprising an electric valve having an anode, a cathode and a grid, the anode-cathode circuit of said electric valve being connected in series relation with said source of alternating current and the primary winding means of said transformer, and means for impressing a voltage on said grid to render said electric valve conducting thereby effecting the transmission of an impulse of current to said transformer to produce in the secondary winding means a voltage of sufficient magnitude to overcome the effect of said hold-off voltage.

2. In combination, an alternating current circuit, a load circuit, electric translating apparatus connected between said circuits and comprising electric valve means for controlling the energization of said load circuit, said electric valve means comprising an anode, a cathode and a control member, bias means for impressing a hold-off voltage on said control member, a source of current, a transformer having a primary winding means and a secondary winding means connected in circuit with said bias means, means comprising an electric valve having an anode, a cathode and a grid, the anode-cathode circuit of said electric valve being connected in series relation with said source and the primary winding means of said transformer, means for impressing a periodic voltage of steep wave front on said grid to render said electric valve conducting thereby effecting the transmission of an impulse of current to said transformer and for producing in the secondary winding means a voltage of sufficient magnitude to overcome the effect of said hold-off voltage, and means for adjusting the phase position of said periodic voltage to control the instant in the voltage wave of said alternating current circuit that said electric valve is rendered conductive.

3. In combination, an alternating current circuit, a load circuit, electric translating apparatus connected between said circuits and comprising electric valve means for controlling the energization of said load circuit, said electric valve means comprising an anode, a cathode and a control member, bias means for impressing a hold-off voltage on said control member, a source of current, a transformer having primary winding means and secondary winding means connected in circuit with said bias means, means comprising an electric valve having an anode, a cathode and a grid, the anode-cathode circuit of said electric valve being connected in series relation with said source, means connected to the grid and cathode of said electric valve for controlling the conductivity thereof and comprising means for producing a periodic voltage, means for superimposing on said periodic voltage a control voltage to render said electric valve conducting thereby effecting the transmission of an impulse of current to said transformer and for producing in the secondary winding means thereof a voltage of sufficient magnitude to overcome the effect of said hold-off voltage, and means for controlling the phase of said periodic voltage to control the magnitude of the current transmitted to said load circuit.

4. In combination, an alternating current circuit, a load circuit, electric translating apparatus connected between said circuits and comprising electric valve means for controlling the energization of said load circuit, said electric valve means comprising a control member, bias means for impressing a hold-off voltage on said control member, a second bias means comprising a parallel connected resistance and a capacitance connected in circuit with said control member and the first mentioned bias means, a source of current, a transformer having primary winding means and secondary winding means, said secondary winding means being connected in circuit with the first mentioned and said second bias means, and means connected in circuit with said source and said primary winding means for transmitting an impulse of current thereto and for inducing in the secondary winding means a voltage impulse of steep wave front and sufficient magnitude to overcome the effect of the first mentioned and said second bias means and render said valve means conducting at the instant that said voltage impulse occurs.

5. In combination, an alternating current circuit, a load circuit, electric translating apparatus connected between said circuits and comprising electric valve means for controlling the energization of said load circuit, said electric valve means comprising a control member, bias means for impressing a hold-off voltage on said control member, a second bias means comprising a parallel connected resistance and a capacitance connected in circuit with said control member and the first mentioned bias means, a source of current, a transformer having primary winding means and secondary winding means, said secondary winding means being connected in circuit with the first mentioned and said second bias means, and means comprising an electric valve having an anode-cathode circuit connected in circuit with said source and said primary winding means for transmitting an impulse of current to the primary winding means and for inducing in the secondary winding means a voltage impulse of sufficient magnitude to overcome the effect of said first mentioned bias means and said second bias means thereby rendering said electric valve means conducting at the instant said voltage impulse occurs.

6. In combination, an alternating current circuit, a load circuit, electric translating apparatus connected between said circuits and comprising electric valve means for controlling the energization of said load circuit, said electric valve means comprising a control member, bias means for impressing a hold-off voltage on said control member, a second bias means comprising a parallel connected resistance and a capacitance connected in circuit with said control member and the first mentioned bias means, a source of current, a transformer having primary winding means and secondary winding means, said secondary winding means being connected in circuit with the first mentioned and said second bias means, means comprising an electric valve having an anode, a cathode and a grid, the anode-cathode circuit being connected in series relation with said source and said primary winding means, and means connected between the grid and cathode of said electric valve for rendering said electric valve conducting at a predetermined adjustable time during a cycle of voltage of said alternating current circuit to determine the instant that said electric valve means is rendered conducting.

7. In combination, an alternating-current supply circuit, a load circuit, electric translating apparatus interconnecting said circuits including reversely connected electric valve means each including a control electrode, a control circuit for controlling the energization of said control electrodes comprising saturable transformer means including primary winding means and a pair of secondary winding means, a pair of electric valves each having an anode, a cathode, and a control member, a supply of alternating voltage having separate terminals each connected to the anode circuit of one of said valves and a terminal connected with the cathodes of said valves, means connecting said primary winding means for energization from said source of alternating voltage under the control of said pair of electric valves in a circuit between the cathodes of said electric valves and said last mentioned terminal, means for impressing on the control members of said electric valves a periodic voltage to render said electric valves conducting alternately at phase positions relative to the respective anode-cathode voltages thereof which effect shock excitation of said saturable transformer means, means for modifying the energization of said control members to vary the instant of initiation of conduction of said electric valves, and means for rendering said electric valve means intermittently non-conductive independently of said periodic voltage to deenergize said load.

8. In combination, an alternating-current supply circuit, a load circuit, electric translating apparatus interconnecting said circuits including reversely connected electric valve means each including a control electrode, a control circuit for controlling the energization of said control electrodes comprising transformer means including primary winding means and secondary winding means including a plurality of terminals, means connecting a different one of said terminals in circuit with the control electrode of each of said valve means, a pair of electric valves each having an anode, a cathode, and a control member, a source of alternating voltage, means connecting said primary winding means for energization from said source of alternating voltage under the control of said pair of electric valves, means for impressing on the control members of said electric valves a periodic voltage to render said electric valves conducting alternately at phase positions relative to the respective anode-cathode voltages thereof which effect shock excitation of said transformer means, means for adjusting the phase position of said periodic voltage to vary the instant of initiation of conduction of said electric valves, and means for impressing on the control members of said electric valves a periodic timing voltage of substantially rectangular wave form for determining the cycles during which said valves are rendered conductive and the cycles during which said valves are maintained non-conductive.

MAURICE E. BIVENS.